United States Patent [19]

Magnollaz et al.

[11] Patent Number: 5,108,280

[45] Date of Patent: Apr. 28, 1992

[54] DEVICE FOR FLUID-TIGHT CONNECTION OF AN EXTRUSION HEAD

[75] Inventors: Gilbert Magnollaz, Cheseaux; Rémy Seigneur, Grandvaux; Jacques Budry, Morrens; Jean-Claude Clément; Michel Jaccottet, both of Ecublens; Pierre-Yves Jaggi, Lausanne; Hans Jaun, La Conversion; Philip De Boer, Bursinel, all of Switzerland

[73] Assignee: Nokia-Maillefer Holding SA, Ecublens, Switzerland

[21] Appl. No.: 676,365

[22] Filed: Mar. 28, 1991

[30] Foreign Application Priority Data

Apr. 3, 1990 [CH] Switzerland .......... 1117/90

[51] Int. Cl.[5] .......................... B29C 47/02
[52] U.S. Cl. .................. 425/133.1; 425/192 R; 425/462
[58] Field of Search ............ 425/380, 381, 382.4, 425/133.1, 462, 192 R, 113

[56] References Cited

U.S. PATENT DOCUMENTS

| | | | |
|---|---|---|---|
| 2,902,923 | 9/1959 | Stacy | 425/381 |
| 3,902,835 | 9/1975 | Theysohn | 425/380 |
| 4,137,027 | 1/1979 | Rüger | 425/192 R |
| 4,277,338 | 7/1981 | Hoagland | 210/186 |
| 4,565,515 | 1/1986 | Maier | 425/381 |
| 4,627,805 | 12/1986 | Schnell | 425/381 |
| 4,652,224 | 3/1987 | Golisch | 425/462 |
| 4,756,682 | 7/1988 | Reifehäuser et al. | 425/462 |
| 4,790,737 | 12/1988 | Fukamachi et al. | 425/133.1 |
| 4,799,874 | 1/1989 | Bellmer et al. | 425/192 R |
| 4,911,628 | 3/1990 | Heilmayr et al. | 425/462 |

FOREIGN PATENT DOCUMENTS

2601619 1/1988 France .

OTHER PUBLICATIONS

Patent Abstracts of Japan, vol. 13, No. 434 (M-875) (3782) 28 Sep. 1989 & JP-A-01166928 (Matsushita Electric Works Ltd.) 30 Jun. 1989.

Primary Examiner—Richard L. Chiesa
Assistant Examiner—William J. Matney, Jr.
Attorney, Agent, or Firm—Oliff & Berridge

[57] ABSTRACT

A movable connection part of an extrusion head is integral with a fixed connection part in a connection unit wherein each moveable connection part and fixed connection part includes elastically deformable tubular members inserted into bores. Jaws are connected to a knuckle-jointed system, which when actuated by a single jack in one direction, will move the jaws away from one another to free the connection parts and when moved by the single jack in an opposite direction, will press the connection parts against one another by acting upon bevels.

7 Claims, 2 Drawing Sheets

DEVICE FOR FLUID-TIGHT CONNECTION OF AN EXTRUSION HEAD

BACKGROUND OF THE INVENTION

This invention relates to extrusion apparatus, and more particularly to a device for fluid-tight connection of an extrusion head of a continuously-operating extrusion line. The extruder is a fixed connection unit fed by at least one extruder, of the type including homologous connection parts on the extrusion head and on the connection unit. The extruder also includes a mechanized locking clamp for fixedly co-operating with the connection parts.

In applicant's co-pending patent application U.S. Ser. No. 07/676,364 filed on the same date as the present application cation, a treatment line equipped with an extrusion head exchanging apparatus is described. The design of such apparatus involves improved means for permitting a fluid-tight connection between an extrusion head which is in working position and the conduit or conduits through which the plastic material reaches the outlet orifice of the connection unit. It must be possible to establish the connection very rapidly and in a faultless manner, avoiding not only leaks of plastic material toward the outside—this plastic material being under high pressure and at a high temperature—but also, as the case may be, disturbances in the flow upon contact with irregularities in the walls which bound the conduits. Until now, no prior art device has satisfied these requirements completely.

SUMMARY OF THE INVENTION

It is an object of this invention to provide an improved device for fluid-tight connection which is capable of operating automatically in an extrusion head exchanging apparatus.

To this end, in the connection device according to the present invention, of the type initially described, at least one pair of homologous ducts contrived in the connection parts is provided with sockets projecting relative to a plane contact surface between the connection parts, and the locking clamp presses the contact surfaces of the two homologous connection parts against one another in such a way that the fluid-tightness of the connections is ensured by elastic deformation of the sockets.

BRIEF DESCRIPTION OF THE DRAWINGS

A preferred embodiment of the invention will now be described in detail with reference to the accompanying drawings, in which.

DETAILED DESCRIPTION OF THE PREFERRED EMBODIMENT

Figure 1:
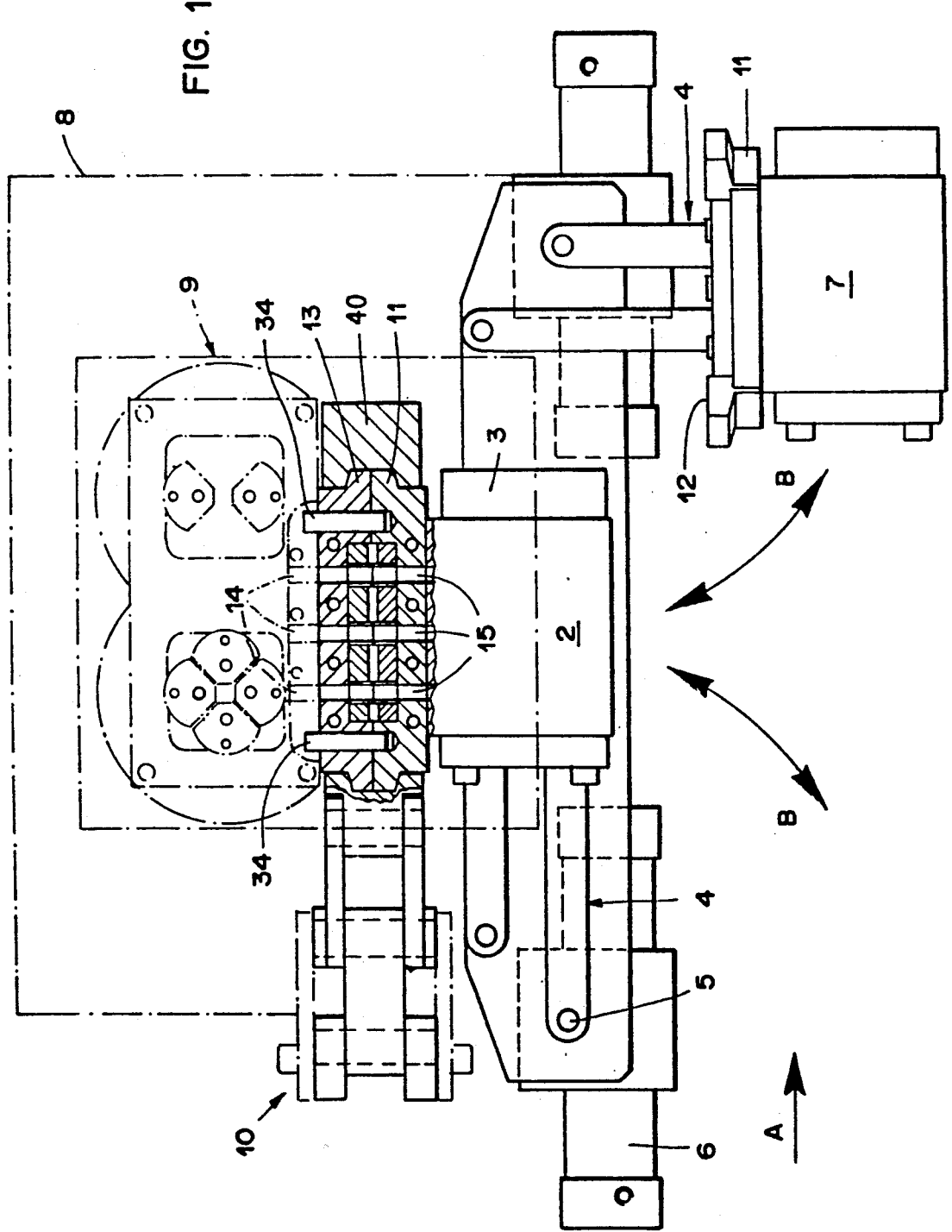
FIG. 1 is a diagrammatic top plan view of an extrusion head exchanging apparatus on a small scale.

FIG. 1 facilitates understanding of the functions to be performed by the various elements of the apparatus to be described below.

Diagrammatically, there is seen in FIG. 1 a zone of an extrusion line in which a metal wire is provided with a coating of extruded plastic material deposited on the wire according to relatively complex operations. In the drawing, the direction of the axis of the line is designated by arrow A, and the wire is supposed to be moving from left to right, although it may equally well be arranged so as to move in the other direction. An extrusion head 2 is shown in working position. The wire enters bare into the opening situated on the left-hand face of the extrusion head 2, and it leaves the right-hand side of this extrusion head through a die 3. This die constitutes an element of an extrusion tooling which may be more or less complex and which is arranged so as to form, on the wire, a coating comprising several parts, e.g., a multi-layer coating or a coating in which an outer layer has veins of a different appearance from the rest of the coating. Wire of this kind is used as an electrical conductor, especially in the automobile industry. Another case of application of the exchanging apparatus described here is the manufacture of cable, e.g., low- or even medium-voltage cable.

The head 3 is supported by a first movable assembly 4 which need not be described in detail here but which can carry out a rotational movement about an axis defined by the pivot 5. A jack 6 permits controlling these rotational movements which then communicate to the head 2 a circular translatory motion, permitting it to be brought into a position symmetrical to that of a head 7 which, for its part, is in preparation position in FIG. 1. The head 7 is associated with a second movable assembly 4 symmetrical with the assembly 4 of the first one and carrying out the same movements in the opposite direction.

Arrows B indicate the circular translatory movements of the heads 2 and 7. A base 8 common to the movable assemblies 4 further bears a connection unit 9 with which a locking clamp 10 is associated. Indeed, as is seen in the lower right-hand part of FIG. 1, each extrusion head used with the exchanging apparatus described comprises a connection part 11 which is rigidly fixed against one of its faces perpendicular to the axis of the pivoting movement of the movable assemblies 4. A plane surface 12 of the connection part 11 is in contact with a homologous plane surface of a connection part 13 which is fixed and integral with the connection unit 9. When the movement of a movable assembly has brought the extrusion head borne by this assembly into the working position, the locking clamp 10 is actuated so that the two homologous connection parts 13 and 11, which face one another, are rigidly fixed to one another, and the connection of the conduits which conduct the plastic material between the extruder or extruders (not shown) feeding the extrusion head and the latter is carried out fluid-tightly, proof against the temperatures and the pressures obtaining in the extrusion processes.

In FIG. 1, which is a diagrammatic figure, the connection part 13 is seen to be connected to three conduits of plastic material designated as 14, these conduits passing through the connection unit to end in intake orifices connected to the extruders. As the number and the mode of connection of the conduits 14 to the extruders do not present any particularities which might pose problems for those skilled in the art, it is not necessary to describe them. The fixed part 13 bears two positioning pins 34 for part 11.

On the other hand, it is important for the clamping of the parts 11 and 13 to be produced in a simple, automatic, and reliable manner, i.e., once the locking has been effected, for the connections between the conduits 14 and inner conduits 15 at the extrusion head and at the connection part 11 to be fluid-tight.

Figure 2:
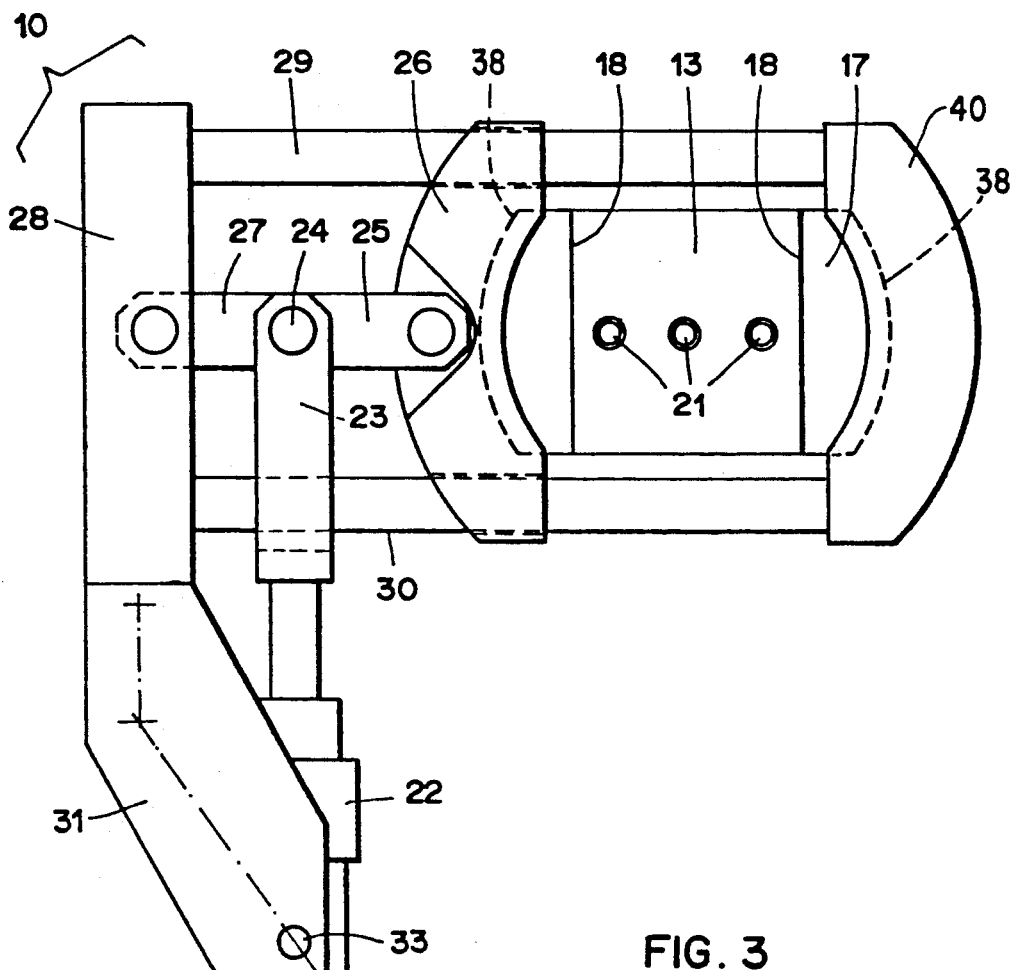
FIG. 2 is a diagrammatic elevation of the extrusion head in working position and of a locking clamp.
Figure 3:
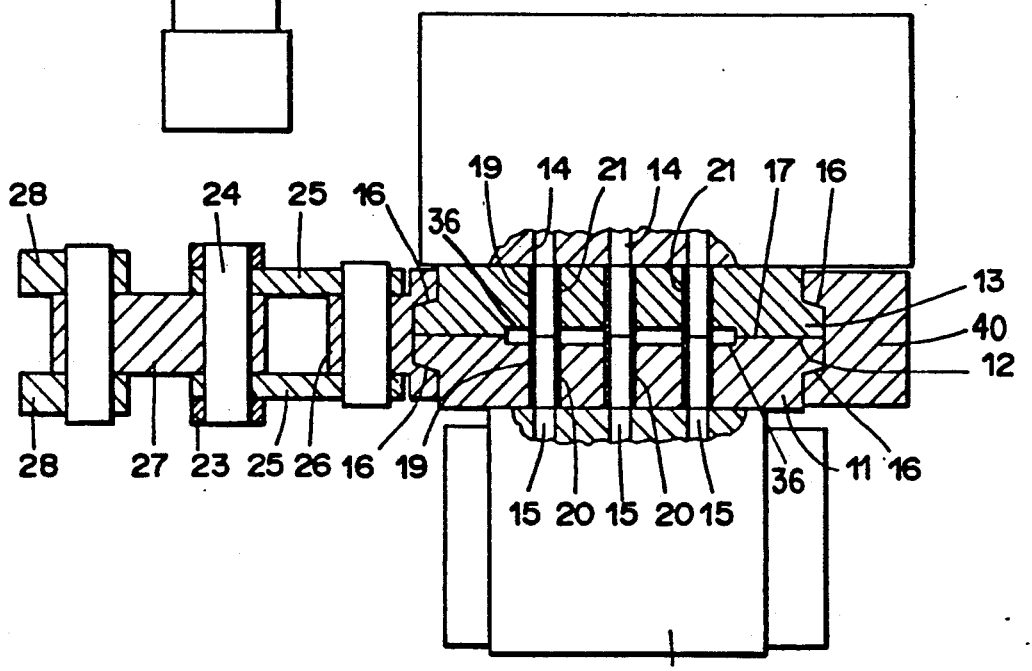
FIG. 3 is a diagrammatic top plan view, partially in section, showing the locking clamp.

FIGS. 2 and 3 respectively show diagrammatically the design of the locking means and the design of the fluid-tightness means provided.

As concerns the fluid-tightness means (FIG. 3), the arrangement of the connection parts 11 and 13 is more particularly visible in this drawing figure. Likewise to be seen in FIG. 2 is the outer shape of the parts 11 and 13, which is that of a rectangle elongated in the horizontal direction, having arcuately rounded ends. The parts 11 and 13 are plates, the rounded sides of which have bevels, designated as 16, extending arcuately. A plane face 17 of the part 13 corresponds to the plane face 12 of the part 11, and each of these faces has in its center a recess 36 bounded by vertical edges 18. Contrived in the bottoms of these hollows are bores 19 which correspond to the conduits 14 and 15. Sockets 20 and 21 are driven into the bores 19 and 20 in such a way that their ends project into the hollows 18. The dimensions and the material of the sockets will be chosen in such a way that at the time of locking, when the faces 12 and 17 are brought into contact with one another, the ends of the sockets are pressed against one another, and each socket undergoes a slight elastic deformation, thus ensuring the fluid-tightness. It is noted that there is always a slight difference in diameter between each one of the conduits 14 or 15 and the bore 19 of the connection part, so that the sockets are pressed into the bottoms of the bores 19, and only the portions thereof projecting out of the bottom of the hollows 18 can be deformed.

There remains to be described the locking clamp permitting the connection to be carried out automatically. This locking clamp comprises first of all a jack 22, the cylinder of which is fixed relative to the connection unit 9. The rod of the jack moves vertically in FIG. 2 and bears at its upper end a stirrup 23, the upper ends of the two arms of which support a spindle 24. The latter passes through two small rods 25 which connect the stirrup 23 to a first jaw 26 and, on the other hand, a small rod 27 which connects the spindle 24 to a frame element 28. This frame element 28 is integral with two rods 29 and 30 which slide in bores of the jaw 26, and the ends of which bear jaw 40.

The frame 28 is itself connected, by a support 31, to a joint 33 on the jack cylinder 22.

It will be realized that if, starting from the position shown in FIG. 2, the jack rod is moved so as to retract into the cylinder, the two jaws 26 and 40 are moved away from one another by the action of the knuckle-joint 23, 27, 25. The jaws 26 and 40 have arcuate inside grooves or cheeks 38 with oblique sides which correspond to the bevels 16 of the connection parts 11 and 13, so that when they are in near position (FIG. 2), the jaws 40 and 26 exert on the parts 11 and 13 forces which press them flat against one another and which, consequently, establish the connection between the deformable sockets 20 and 21.

The locking clamp and the connection unit described above may be devised in such a way as to permit varied connections and to be applicable in a very great number of cases where multiple extrusions are to be effected from several extruders, but using one extrusion head with suitable tooling. The exchanging and connection of an extrusion head may therefore be carried out in efficient conditions without necessitating a long stoppage of the extrusion line and, consequently, without risk of disturbing the operation of the various extruders.

The latter keep their temperature conditions, which represents a considerable advantage for the reliability of the line and the quality of the coatings carried out.

What is claimed is:

1. An extrusion head exchanging apparatus for a continuously operating extrusion line, comprising:
   a plurality of extrusion heads, each of said extrusion heads having a moveable connection part;
   at least one moveable assembly for moving an extrusion head from a preparation position into a working position;
   a feeding unit having a fixed connection unit with a fixed connection part; and
   a mechanized locking clamp for fixedly clamping the moveable connection part of any one of the extrusion heads to the fixed connection part when said one extrusion head is moved into the working position,
   said fixed connection part and said moveable connection parts each including;
   clamping surfaces for cooperating with the locking clamp;
   a plane contact surface; and
   a recess in the plane contact surface and at least one duct ending within the recess, each duct being lined with an elastically deformable tubular member, said tubular member being held in said duct and protruding into said recess,
   wherein said plane surfaces, said tubular members and said clamping surfaces of said fixed and moveable connection parts are adjusted relative to one another upon mechanized action of said locking clamp for simultaneously providing mutual contact between the plane surfaces of said fixed connection part and the moveable connection part of the extrusion head in the working position, and fluid-tight connection between each one of said tubular members of said fixed connection part and a corresponding one of said tubular members in the moveable connection part of the extrusion head in working position.

2. The extrusion head exchange apparatus according to claim 1, wherein said ducts and said tubular members are cylindrically shaped, with an axis perpendicular to the plane contact surface.

3. The extrusion head exchange apparatus according to claim 2, wherein each duct comprises an annular bottom shoulder, each tubular member is axially retained within a corresponding duct through the annular bottom shoulder and each tubular member protrudes from the recess a distance greater than a depth of the recess so that elastical deformation of each tubular member occurs upon clamping and alignment of the fixed and moveable connection parts.

4. The extrusion head exchange apparatus according to claim 2, wherein said at least one moveable assembly includes means for providing a translatory movement of the extrusion head, said translatory movement having a direction perpendicular to the plane contact surface of the fixed connection part, at least during a portion of said movement near the fixed connection unit.

5. The extrusion head exchange apparatus according to claim 4, wherein two moveable assemblies are placed symmetrically and act alternatively, with respect to the fixed connection unit.

6. The extrusion head exchange apparatus according to claim 4, wherein the clamping surfaces on each of the fixed and moveable connection parts include two bevelled rear clamping surfaces, said locking clamp includes two jaws, each of said jaws having a pair of cheeks adapted to act upon the rear clamping surfaces by a centripetal movement of the jaws in a direction parallel to the plane of the plane contact surfaces.

7. The extrusion head exchange apparatus according to claim 6, wherein said locking clamp includes a single jack and a knuckle-joint mechanism actuated by said single jack for causing a symmetrical and centripetal movement of the jaws.

* * * * *